United States Patent [19]

Tanoue et al.

[11] Patent Number: 4,833,359
[45] Date of Patent: May 23, 1989

[54] DRIVING APPARATUS FOR ULTRASONIC MOTOR

[75] Inventors: Hiromi Tanoue, Kadoma; Noriyuki Harao, Ikoma; Kenichiroh Takahashi, Katano, all of Japan

[73] Assignee: Matsushita Electric Industrial Co., Ltd., Kadoma, Japan

[21] Appl. No.: 143,093

[22] Filed: Jan. 12, 1988

[30] Foreign Application Priority Data

Jan. 27, 1987 [JP] Japan .................................. 62-16945

[51] Int. Cl.⁴ ............................................ H01L 41/08
[52] U.S. Cl. .................................... 310/316; 310/317; 310/323; 318/116
[58] Field of Search ............... 310/316, 317, 323, 328, 310/319; 318/116, 118

[56] References Cited

U.S. PATENT DOCUMENTS

| | | |
|---|---|---|
| 4,510,411 | 4/1985 | Hakamata et al. .................. 310/316 |
| 4,513,219 | 4/1985 | Katsuma et al. ................. 310/317 X |
| 4,658,172 | 4/1987 | Izukawa .............................. 310/316 |
| 4,713,571 | 12/1987 | Suzuki et al. ........................ 310/316 |
| 4,727,276 | 2/1988 | Izukawa et al. ...................... 310/316 |
| 4,743,788 | 5/1988 | Takagi et al. ........................ 310/316 |
| 4,743,789 | 5/1988 | Puskas ................................. 310/316 |
| 4,749,896 | 6/1988 | Suzuki et al. ........................ 310/316 |

FOREIGN PATENT DOCUMENTS 3048632 7/1982 Fed. Rep. of Germany .

Primary Examiner—Mark O. Budd
Attorney, Agent, or Firm—Cushman, Darby & Cushman

[57] ABSTRACT

In a driving apparatus for an ultrasonic motor, which motor has a stator comprising a pair of piezoelectric members for generating travelling mechanical vibrations, the driving apparatus has an oscillator, a phase shift circuit, and delay circuits. By deferring phases of two control signals for two switching devices, there is no fear of dangerous simultaneous turn-ons of the switching devices.

6 Claims, 7 Drawing Sheets

DRIVING APPARATUS FOR ULTRASONIC MOTOR

FIELD OF THE INVENTION AND RELATED ART STATEMENT

1. Field of the Invention

The present invention relates to an ultrasonic motor for generating a driving force by using a piezoelectric member, and more particularly, to a driving apparatus for driving piezoelectric members for oscillating elastic members of the ultrasonic motor.

2. Description of the Related Art

In recent years, an ultrasonic motor has become important since the ultrasonic motor has higher output per unit volume than prior art motor. The ultrasonic motor makes rotation movement or running movement by making ultrasonic vibration by electromechanical conversion element such as piezoelectret members.

FIG. 1 and FIG. 2 show a general structure of the conventional ultrasonic motor. In FIGS. 1 and 2, the ultrasonic motor 12 is constituted by a stator 4 having stacked circular-shaped piezoelectric members 1 and 2 and an elastic member 3, a circular-shaped rotor 6 having a lining member 5 touched with the stator 4, a bearing 7, a clamping member 8 and terminals 9, 10, 11 for applying electric signals to the two piezoelectric members 1 and 2. In FIG. 1 and electrodes of the piezoelectric members 1, 2 are constituted in such a manner that four ridges of flexural vibrations are made in the radial direction. Polarizations of adjacent electrodes 113 on the piezoelectric member 1 are made opposite to each other. The piezoelectric member 1 is stuck with the piezoelectric member 2 having a phase difference of ¼ wavelength (90°) of flexural vibrations. In the opposite surface (lower surface; not shown in FIG. 1) of the piezoelectric members 1 and 2, electrodes are formed to cover the whole surface.

FIG. 3 shows circuitry 22 of a driving apparatus for the ultrasonic motor. An oscillation device 13 outputs two signals A and B, which have a phase difference of 90° to each other, of a driving frequency fd particularly suited to the stator 4 of ultrasonic motor 12. Inverters 14 and 15 invert the polarity of signals B and A, respectively. A transformer 20 has a main winding with a middle tap 20b, and a transformer 21 has a main winding with a middle tap 21b. A DC source 23 is connected to the middle taps 20b and 21b. Switching devices 16 and 17 are connected to a terminal 20a of primary windings and a terminal 20c of primary windings of the transformer 20, respectively. Switching devices 18 and 19 are connected to a terminal 21a of primary windings and terminal 21c of primary windings of the transformer 21, respectively. The switching devices 16, 17, 18 and 19 carry out switching operations in response to outputs of the oscillator 13 and inverter circuits 14 and 15. The secondary windings of the transformers 20 and 21 are connected to terminals 9, 10 and 11 of the ultrasonic motor 12.

FIG. 4 shows wave-forms of respective parts of the circuit of FIG. 3. The output A of oscillator 13 has a wave-form I having a duty factor of 1 (high state time is the same as low state time), and the output B of oscillator 13 has a waveform J having a duty factor of 1. There is a phase difference t7 of 90° between the signals I and J. A signal K shows the output signal A of oscillator 13 whose output is to be inputted into the switching device 18. A signal L shows the inverted signal made by inverting the output signal A by the inverter 15, whose output is to be inputted into the switching device 19. A signal M shows an output signal generated between the terminals 21d and 21e of the secondary windings of transformer 21.

The output B of oscillator 13 is handled in the same manner as the output A described above in the other half of the driving circuit 22.

Referring now to FIG. 4, the operation of the circuit of FIG. 3 is described. When the signal A is output from the oscillator 13, the signal K is inputted into the switching device 18 and the signal L is inputted into the switching device 19. Therefore, the switching devices 18 and 19 alternately are turned on. On-state of switching device 18 makes a current which flows from terminal 21b to terminal 21a of the primary winding. On-state of switching device 19, i.e. off-state of switching device 18, makes a current which flows from terminal 21b to terminal 21c. By alternately switching the switching devices 18 and 19, the current direction of primary winding of transformer 21 is changed. Therefore, the waveform M is produced between the terminals 21d and 21e of secondary windings of transformer 21. In respect of the transformer 20, the same operation is also made. A.C. voltages having a phase difference of 90° to each other, are generated on the secondary windings of transformers 20 and 21. These phase difference A.C. voltages are impressed on the piezoelectric members 1 and 2. The ultrasonic vibration procedures generating traveling waves on the stator 4. Therefore, rotating force can be generated.

When the stator 4 is driven, crest of vibrations (maximum displacement point) of the stator 4 at the part facing the rotor 6 contact the rotor 6, and that the crest of vibration moves as time goes on. Therefore, a force around the axis is given to the rotor 6. Thus, the rotor 6 rotates as the rotor 6 repeatedly receives the force of traveling waves rotating around the axis at a driving frequency fd which is particular to the stator 4.

In such an ultrasonic motor, it is necessary to impress A.C. voltages which have a phase difference of 90° from each other to two piezoelectric members constituting the stator for generating the traveling wave on the stator and obtaining the rotating force. Therefore, an oscillator which can generate two signals of A.C. voltages having a phase difference of 90° with respect to each other is necessary. Therefore, the conventional driving device becomes enlarged.

Besides, in some cases, there is a liability that the switching devices 16 and 17 (or 18 and 19) become simultaneously on-states. In such cases, the switching devices are destroyed because of short-circuiting states made by such simultaneous on-state.

OBJECT AND SUMMARY OF THE INVENTION

It is an object of the present invention to provide a driving apparatus for an ultrasonic motor which achieves stable operation and small size.

A driving apparatus for an ultrasonic motor in accordance with present invention comprises an oscillator, and a phase shift circuit for issuing two signals having a phase difference of 90° to each other, based on output of the oscillator. Delays circuits are used for delaying the rising edge of the two signals issued from the phase shift circuit for desired time periods and the rising edge of two inverted signals generated by inverting the two signals for desired time periods, to produce four outputs; and A driving circuit which drives piezoelectric members of an ultrasonic motor based on outputs of the delay circuits.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
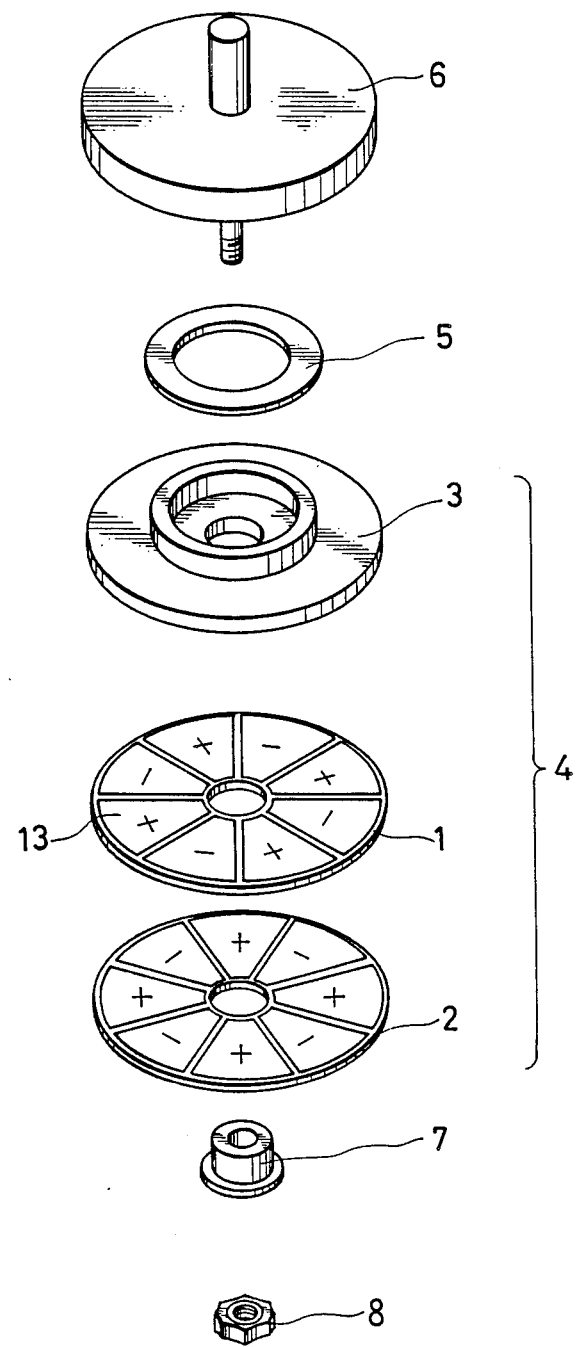
FIG.-1 is the exploded view of the general ultrasonic motor.
Figure 2:
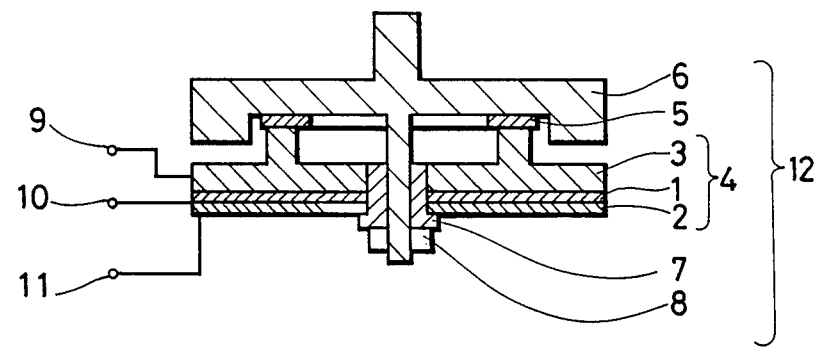
FIG.-2 is the cross-sectional view of the ultrasonic motor.

Referring now to the drawings, a preferred embodiment of the present invention is described hereafter.

Figure 3:
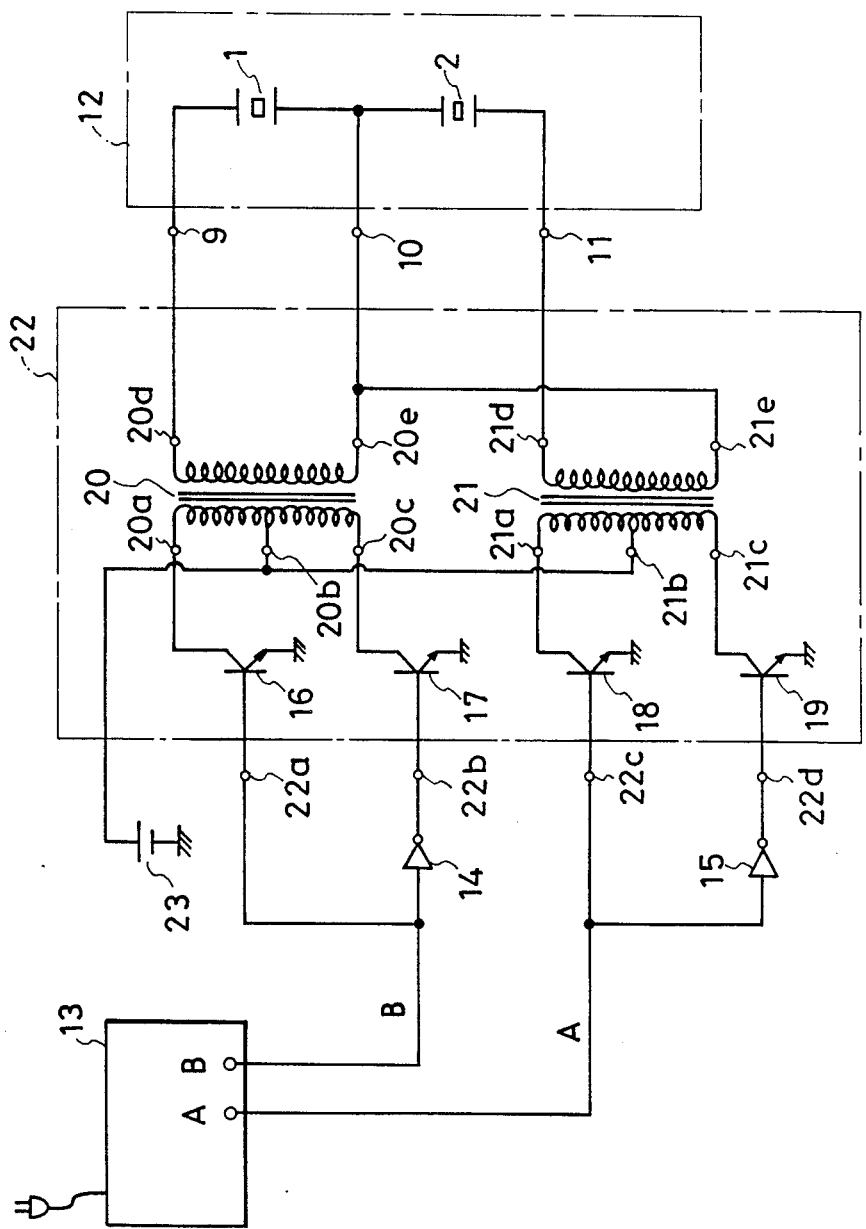
FIG.-3 is the circuit diagram of driving apparatus for an ultrasonic motor of the prior art.
Figure 4:
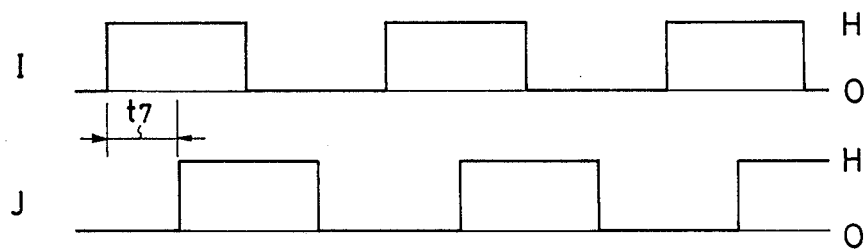
FIG.-4 is the wave form chart of the the circuit of FIG.-3.
Figure 4:
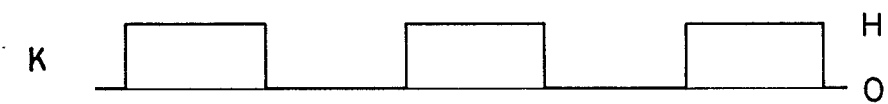
Figure 4:
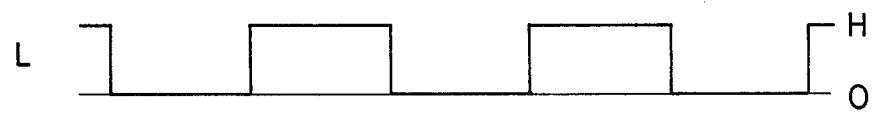
Figure 4:
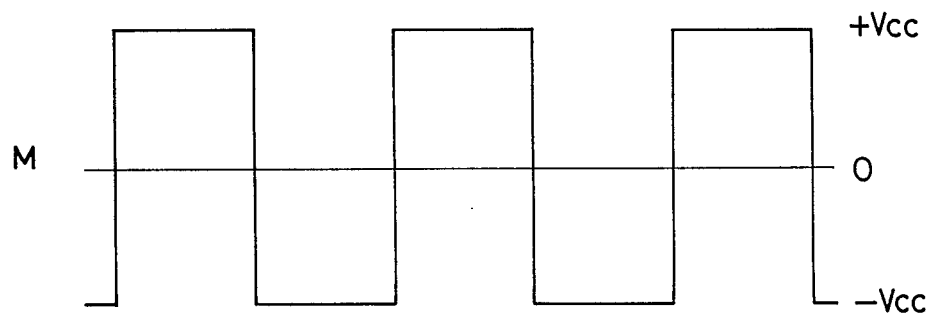
Figure 5:
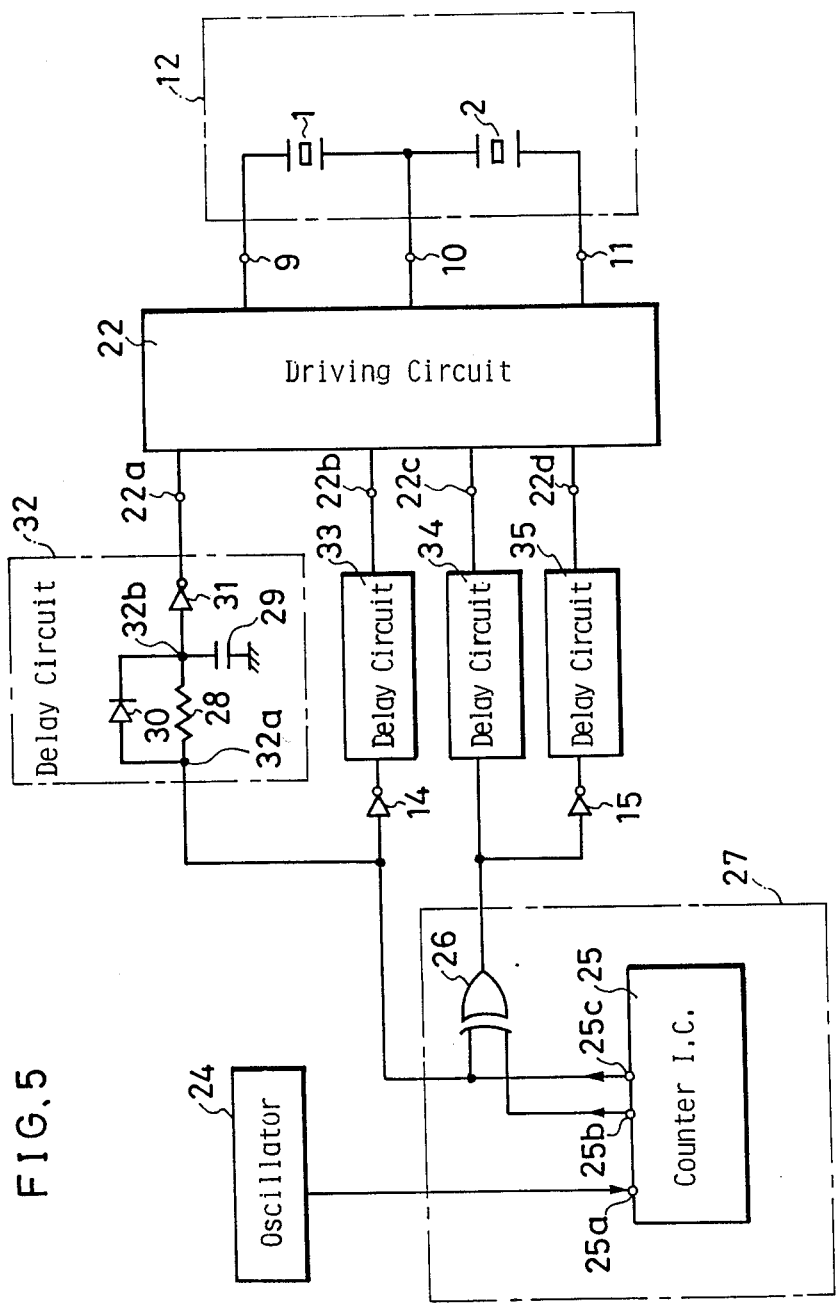
FIG.-5 is a circuit diagram of driving apparatus for an ultrasonic motor of a preferred embodiment of a present invention.

FIG.-5 shows a driving apparatus for ultrasonic motor of a preferred embodiment of the present invention. The same reference numerals with FIG.-3 designate the same or corresponding components with FIG.-3.

In FIG.-5, an ultrasonic motor 12 is shown to have electric circuit of piezoelectric members 1 and 2. The piezoelectric members 1 and 2 are connected to secondary windings of a transformer as driving circuit 22. An oscillator 24 comprises a timer IC which is available on the market, resistors, capacitors and etc., and is constituted as an astable multivibrator. A phase shift circuit 27 comprises a counter IC 25 and an exclusive OR 26 (hereinafter referred to as an EOR gate). The counter IC 25 has a clock terminal 25a, an output terminal 25b for ½-frequency divided clock signal and an output terminal 25c for ¼-frequency divided clock signal.

A delay circuit 32 comprises an integrating circuit constituted by a resistor 28 and a capacitor 29, a diode 30 and an inverter (NOT) circuit for waveform shaping. Delay circuits 33, 34 and 35 has the same construction as the delay circuit 32. The driving circuit 22 has the same construction as the driving circuit 22 shown in FIG. 3.

Figure 6:
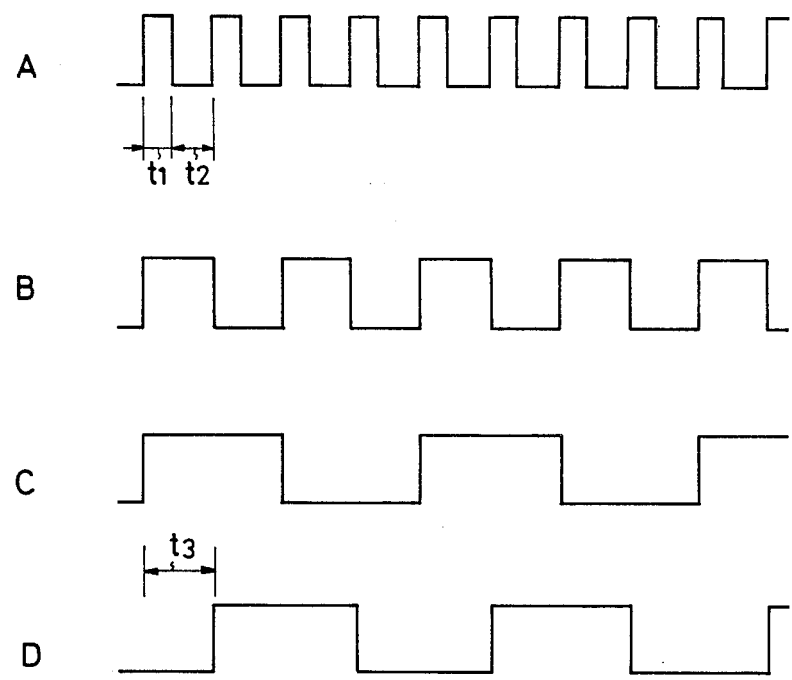
FIG.-6 is a wave form chart of a phase shift circuit of FIG.-5.
Figure 7:
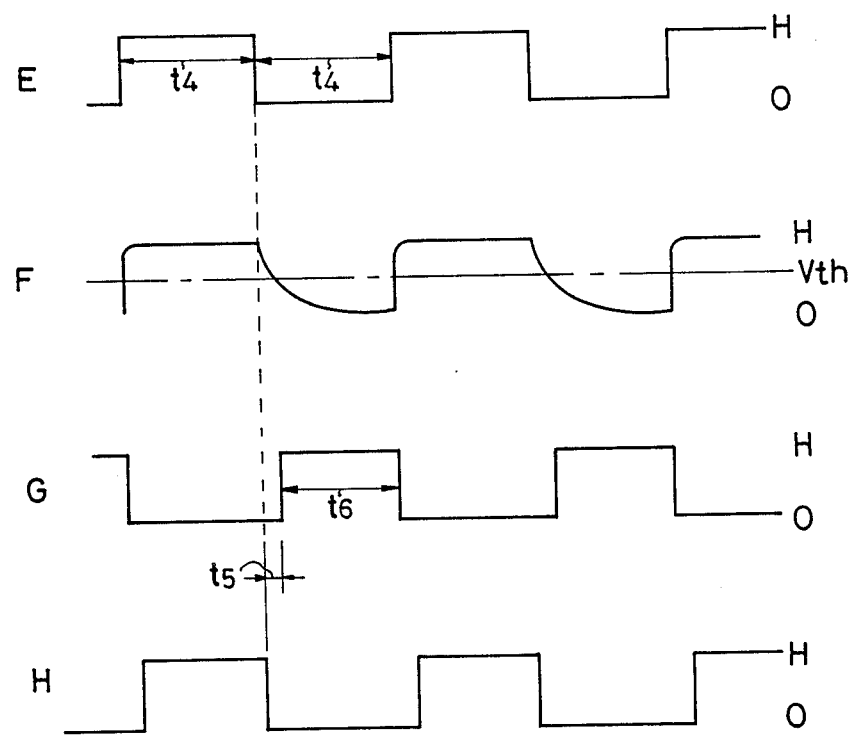
FIG.-7 is a wave form chart of a delay circuit of FIG.-5.

FIGS. 6 and 7 show waveform in circuit of FIG. 5. The oscillator 24 as an astable multivibrator outputs signal A shown in FIG. 6 to the clock terminal of the counter IC 25. As shown in FIG. 6, duty factor of this signal is t1:t2 where t1 is a time of high state and t2 is a time of low state and the time t1 is not equal to the time t2. When the signal A is inputted into the terminal 25a of counter IC 25, the counter IC 25 outputs ½-frequency divided signal B from the signal A on the terminal 25b and outputs ¼-frequency divided signal C from the signal A on the terminal 25c, EOR gate 26 inputs the signals B and C and outputs a signal D which has phase a difference t3 of 90° to the signal C. The signal C from the terminal 25c is impressed directly to the delay circuit 32 and is impressed on the delay circuit 33 after inverting it by the inverter 14. Also, the signal D from the EOR gate 26 is impressed directly on the delay circuit 34 and is impressed on the delay circuit 35 after inverting it by the inverter 15.

Referring now to FIG. 7, operation of the delaying circuit is described hereafter. The signal E shows the signal on a point 32a, a signal F shows the signal on a point 32b and a signal G shows the output signal from NOT gate 31.

When the "H" (shows 5 V) signal is impressed on the point 32a, a forward direction current flows in the diode 30. Therefore, a difference voltage between "H" voltage and base-emitter voltage $V_{BE}$ of the diode 30 is generated on the point 32b in a moment. Then, the voltage on the point 32b rises to "H" voltage by charging function of the resistor 28 and capacitor 29. Next, when the voltage of point 32a becomes zero voltage, the voltage of point 32b slowly drops from "H" voltage to zero voltage by a discharging function of the resistor 28 and capacitor 29 (see curve of signal F in FIG. 7).

The signal F is inputted into NOT gate 31 for waveform shaping. NOT gate 31 outputs the signal G whose rise edge is delayed by time t5 to the end edge of the signal E because NOT gate 31 has the threshold voltage $V_{th}$. While the level of signal E in "H" state time (=t4) is the same as "L" state time (=t4), "H" state time (=t6) in the signal G is shorter than "L" state time (=t4+t5). Therefore, the rise edge of signal G is delayed from the rising edge of signal E.

Signal H is obtained by delaying the signal E in the delay circuit 33 after inverting in the inverter 14.

As seen from the signals G and H, a time interval t5 is made between the rising edge of signal G and the end edge of signal H or between the end edge of signal G and the rise edge of signal H. Therefore, by using the signals G and H as a driving signal for driving circuit 22, undesirable simultaneous turning on of the two switching devices is prevented.

Although in the preferred embodiment of the invention, the high state time t1 of signal A is not equal to the low state time t2 of signal A; and in other modified preferred embodiment of the present invention, the high state time t1 of signal A may be equal to the low state time t2 of signal A. That is, the duty factor of signal A may be 1. In preferred embodiment, the signal A is directly inputted into the delay circuit 32 and inputted into the delay circuit 33 after delaying. The signal B, ½-frequency divided signal, and the signal A are inputted into EOR gate 26. Output of EOR gate 26 is inputted into the delay circuit 34 and is inputted into the delay circuit after delaying. Therefore, in this preferred embodiment, ¼-frequency divided signal is not necessary.

As has been described in detail for several preferred embodiments, the driving apparatus for an ultrasonic motor in accordance with the present invention achieves stable operation irrespective of simple structure.

Although the invention has been described in its preferred form with a certain degree of particularity, it is understood that the present disclosure of the preferred form may be changed in the details of construction and the combination and arrangement of parts may be resorted to without departing from the spirit and the scope of the invention as hereinafter claimed.

What is claimed is:

1. A driving apparatus for an ultrasonic motor comprising:
   an oscillator;
   a phase shift circuit for receiving an output of said oscillator and issuing two signals having a phase difference of 90° with respect to each other, said phase shift circuit comprising a frequency divider which divides the output frequency of said oscillator into ½- and ¼-frequency signals and an exclusive OR circuit which receives said ½- and ¼-frequency signals and generates one of said two signals having a phase difference of 90° with respect to said ¼-frequency signal;
   delay circuits for delaying rising edges of said two signals issued from said phase shift circuit for a desired time period and for delaying for a desired time period rising edges of two inverted signals generated by inverting said two signals, to produce four outputs; and
   a driving circuit which drives piezoelectric members of an ultrasonic motor based on outputs of said delay circuits.

2. A driving apparatus for an ultrasonic motor in accordance with claim 1, wherein
   said oscillator is an astable multivibrator.

3. A driving apparatus for an ultrasonic motor in accordance with claim 1, wherein
   said delay circuit comprises an integrating circuit having a resistor and a capacitor, a diode connected in parallel with said resistor, and an inverter for shaping an output signal of said integrating circuit.

4. A driving apparatus for an ultrasonic motor in accordance with claim 1, wherein
   said driving circuit comprises transformers wherein secondary windings are connected to said piezoelectric members and to switching devices connected to primary windings of said transformers, to switch a DC power source in response to the output of said delay circuit.

5. A driving apparatus for an ultrasonic motor having, a stator which comprises a pair of piezoelectric members and is for generating traveling mechanical vibrations when high frequency voltages having a phase difference to each other are alternately applied to said piezoelectric members and a rotor driven by said mechanical vibration of said stator, said driving apparatus comprising:
   an oscillator;
   a phase shift circuit which receives an output of said oscillator and outputs two signals having a phase difference of 90° with respect to each other;
   delay circuits for delaying rising edges of said two signals outputted from said phase shift circuit for a desired time period and for delaying for a desired time rising edges of two inverted signals generated by inverting said two signals, to produce four outputs;
   switching devices driven by said four outputs of said delay circuits;
   transformers having primary windings connected to said switching devices and secondary windings connected to said pair of piezoelectric members; and
   said switching device switching a DC power source fed to said transformers for applying high frequency voltage on said pair of piezoelectric members.

6. A driving apparatus for an ultrasonic motor in accordance with claim 5, wherein
   said transformers have primary windings with a middle tap connected to said DC power source; and
   said switching device are connected to the end taps of said primary windings.

* * * * *